(12) United States Patent
Murayama

(10) Patent No.: US 8,186,379 B2
(45) Date of Patent: May 29, 2012

(54) ELECTROMAGNETIC VALVE AND METHOD FOR MANUFACTURING THE SAME

(75) Inventor: Takashi Murayama, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1020 days.

(21) Appl. No.: 12/213,086

(22) Filed: Jun. 13, 2008

(65) Prior Publication Data

US 2009/0001302 A1    Jan. 1, 2009

(30) Foreign Application Priority Data

Jun. 26, 2007  (JP) ................................. 2007-167574
Feb. 26, 2008  (JP) ................................. 2008-044051

(51) Int. Cl.
F16K 37/00    (2006.01)

(52) U.S. Cl. ................... 137/554; 137/557; 251/129.15

(58) Field of Classification Search ............. 251/129.15, 251/129.18, 129.19; 137/315.03, 554, 557; 335/227, 281, 255; 310/14, 23, 30, 34; 303/119.1, 303/119.2
See application file for complete search history.

(56) References Cited

U.S. PATENT DOCUMENTS

| | | | |
|---|---|---|---|
| 3,772,540 A * | 11/1973 | Benson ........................... | 310/14 |
| 5,139,227 A * | 8/1992 | Sumida et al. ........... | 251/129.08 |
| 5,167,442 A * | 12/1992 | Alaze et al. ................ | 303/113.2 |
| 5,402,824 A * | 4/1995 | Hosoya et al. ........... | 137/596.17 |
| 5,593,132 A * | 1/1997 | Hrytzak .................... | 251/129.15 |
| 5,608,369 A * | 3/1997 | Irgens et al. ................... | 335/281 |
| 5,994,895 A * | 11/1999 | Bolte et al. ................ | 324/207.16 |
| 6,116,269 A * | 9/2000 | Maxson ...................... | 137/487.5 |
| 6,199,961 B1 * | 3/2001 | Beck ......................... | 303/116.1 |
| 6,213,568 B1 * | 4/2001 | Feigel ........................ | 303/114.1 |
| 6,309,030 B1 * | 10/2001 | Feigel ........................ | 303/113.1 |
| 6,374,679 B1 * | 4/2002 | Babala et al. ................... | 73/715 |
| 6,422,206 B1 * | 7/2002 | Wade et al. ..................... | 123/458 |
| 6,554,375 B1 * | 4/2003 | Dinkel et al. .............. | 303/119.3 |
| 6,591,684 B2 * | 7/2003 | Babala et al. ................... | 73/715 |
| 6,745,634 B2 * | 6/2004 | Beck et al. ...................... | 73/756 |
| 6,845,762 B2 * | 1/2005 | Modien ..................... | 123/568.21 |
| 7,246,632 B2 * | 7/2007 | Ohi et al. .................... | 137/15.18 |
| 2001/0050347 A1 * | 12/2001 | Otsuka et al. ............ | 251/129.15 |
| 2002/0047304 A1 * | 4/2002 | Bolitho et al. ............. | 303/119.2 |
| 2005/0274921 A1 | 12/2005 | Segawa et al. | |
| 2007/0257222 A1 * | 11/2007 | Ohi et al. .................. | 251/129.19 |

FOREIGN PATENT DOCUMENTS

JP    2005-351410 A    12/2005

* cited by examiner

*Primary Examiner* — John Rivell
*Assistant Examiner* — Matthew W Jellett
(74) *Attorney, Agent, or Firm* — Buchanan Ingersoll & Rooney PC

(57) ABSTRACT

An electromagnetic valve has an electromagnetic coil supported by a cylindrical yoke, a movable armature within a sleeve, a stator core fixed to one end of the sleeve, wherein one end of the stator core protrudes from an end of the yoke. A pressure sensor is attached to a protruding end of the stator core. A magnetic flux limiting portion is formed in the stator core at such a position which is on a side of the protruding end of the stator core toward the pressure sensor. A magnetic flux flow to the pressure sensor is limited by the magnetic flux limiting portion, so that a precise detection by the sensor can be achieved even when the sensor is arranged closer to the electromagnetic coil.

12 Claims, 4 Drawing Sheets

ELECTROMAGNETIC VALVE AND METHOD FOR MANUFACTURING THE SAME

CROSS REFERENCE TO RELATED APPLICATION

This application is based on Japanese Patent Application No. 2007-167574 filed on Jun. 26, 2007 and No. 2008-044051 filed on Feb. 26, 2008, the disclosures of which are incorporated herein by reference.

FIELD OF THE INVENTION

The present invention relates to an electromagnetic valve, to which a sensor is integrally assembled, and a method for manufacturing such electromagnetic valve.

BACKGROUND OF THE INVENTION

An electromagnetic valve integrally having a sensor is known in the art, for example, Japanese Patent Publication No. 2005-351410, in which a pressure sensor is attached to an end surface of a stator core.

In the conventional electromagnetic valve, however, the pressure sensor is arranged at such a substantial distance from an electromagnetic coil. This is because the pressure may not be precisely detected, as a result that electromagnetic noise is generated in the pressure sensor in the case that the pressure sensor is arranged at a position closer to the electromagnetic coil and electric current is supplied to the electromagnetic coil. Accordingly, it is a problem that the electromagnetic valve may become larger in its size.

SUMMARY OF THE INVENTION

The present invention is made in view of the foregoing problems, and has an object to provide an electromagnetic valve, which enables a precise detection by a sensor and a smaller size.

According to one of the features of the present invention, an electromagnetic valve has a valve unit which includes; an electromagnetic coil for generating magnetic field when electric current is supplied thereto; a yoke made of magnetic material and accommodating the electromagnetic coil; a stator core arranged at its one end in an inner periphery of the electromagnetic coil, the other end of the stator core being outwardly protruding from an end of the yoke; and an armature made of magnetic material and arranged in an inner periphery of the electromagnetic coil in such a manner that the armature slides in an axial direction of the electromagnetic coil, so that the armature is attracted toward the stator core when the electric current is supplied to the electromagnetic coil. The electromagnetic valve further has a sensor attached to a protruding end of the stator core for detecting at least one of a condition of the valve unit and a condition of fluid filled in the valve unit, wherein a magnetic flux limiting portion is formed in the stator core on a side of the protruding end toward the sensor for suppressing magnetic flux flow to the sensor.

According to the above feature of the present invention, since the magnetic flux flow to the sensor is suppressed by the magnetic flux limiting portion, generation of magnetic noise in the sensor is reduced even when the sensor and the coil are arranged closer to each other. Accordingly, precise detection at the sensor can be achieved and at the same time the electromagnetic valve can be made smaller in its size.

Furthermore, the magnetic flux, which is suppressed from flowing toward the sensor, flows through the armature. As a result, the performance of the electromagnetic valve (for example, response, attracting force, etc.) is improved.

According to another feature of the invention, the magnetic flux limiting portion is formed by a groove formed at an outer peripheral surface of the stator core. According to the above feature of the invention, since the magnetic flux limiting portion is formed by the groove, which can be manufactured by the cutting process, the magnetic flux limiting portion can be more easily formed in the stator core when compared with a case in that the magnetic flux limiting portion is formed by the heating and cooling process. This is because a crack is likely to be generated in the material for the stator core during a process of rapid heating and rapid cooling.

According to a further feature of the invention, the groove for magnetic flux limiting portion is a circular groove formed at the outer peripheral surface of the stator core. According to such a feature, the magnetic flux flow to the sensor can be more surely suppressed, when compared with a case in which the magnetic flux limiting portion is formed by a groove which is partly formed at an outer periphery of the stator core.

According to a still further feature of the invention, the magnetic flux limiting portion is formed by a non-magnetized portion of the stator core. According to such a feature, the magnetic flux flow to the sensor can be also suppressed.

According to a still further feature of the invention, a method of manufacturing the electromagnetic valve has a step for carrying out laser radiation for such a portion of the stator core, which corresponds to the magnetic flux limiting portion, wherein the stator core is made of such material, which is non-magnetized when it is heated.

According to such a method, since the portion of the stator core is heated by the laser radiation, it is easy to heat a narrow area which should be non-magnetized. In addition, a manufacturing time can be made shorter, when compared with the case in which the groove is formed by the cutting process to form the magnetic flux limiting portion.

According to a still further feature of the invention, a method of manufacturing the electromagnetic valve has a step for winding a different metal of non-magnetic material around an outer periphery of the stator core, the different metal being different from a metal for the stator core; and a step for melting the different metal and a base material of the stator core to form the magnetic flux limiting portion. According to such a method, it is easy to form the magnetic flux limiting portion in the stator core, which is made of such a material that is not non-magnetized by heating process.

According to a still further feature of the invention, nickel foil can be used as the different metal in the above method of manufacturing the electromagnetic valve.

According to a still further feature of the invention, the different metal and the base material of the stator core are molten by heat of laser radiation in the above method of manufacturing the electromagnetic valve. According to this feature, a manufacturing time can be made shorter, when compared with the case in which the groove is formed by the cutting process to form the magnetic flux limiting portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
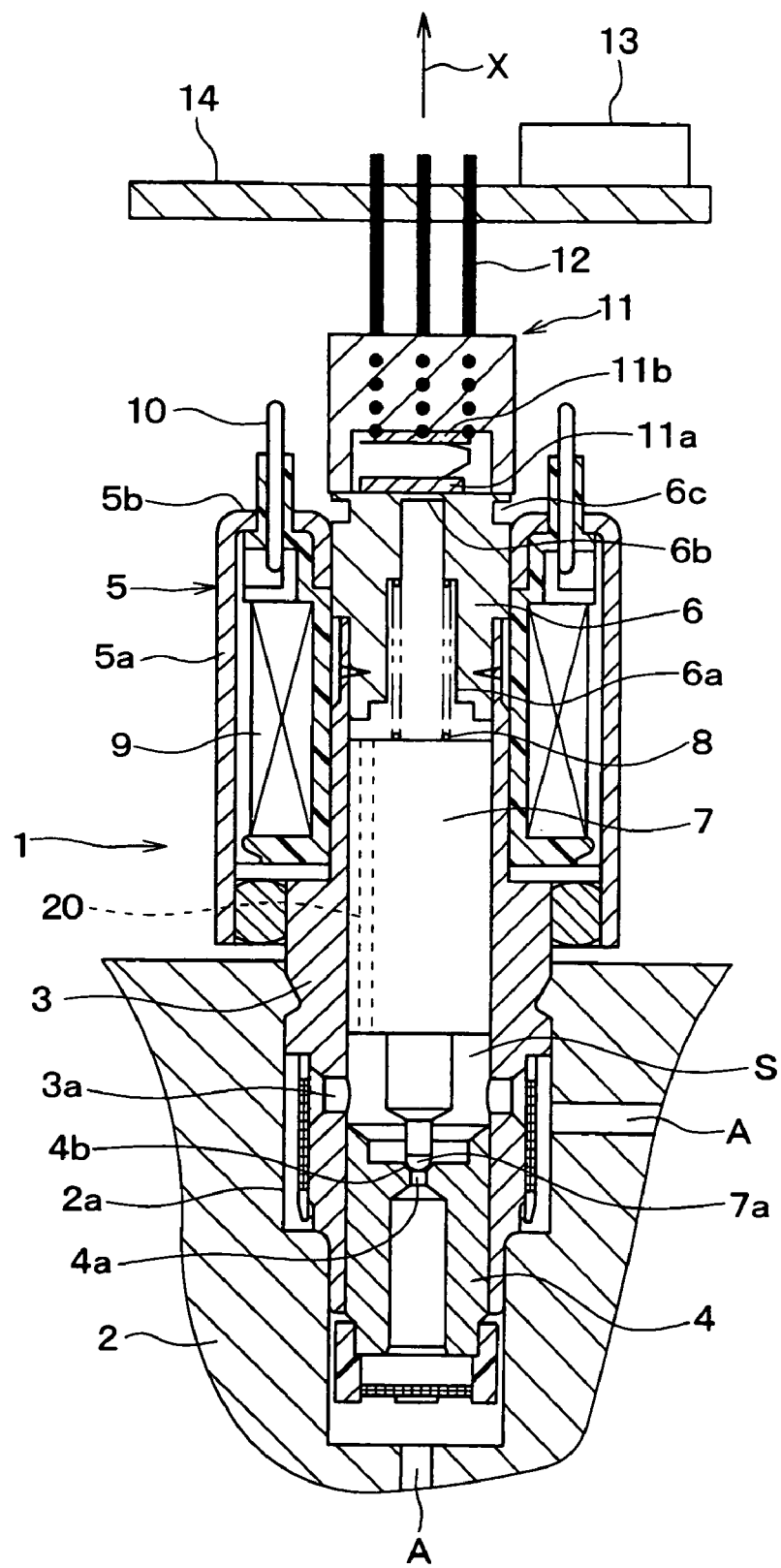
FIG. 1 is a cross sectional view showing an entire structure of an electromagnetic valve according to a first embodiment of the present invention.
Figure 2:
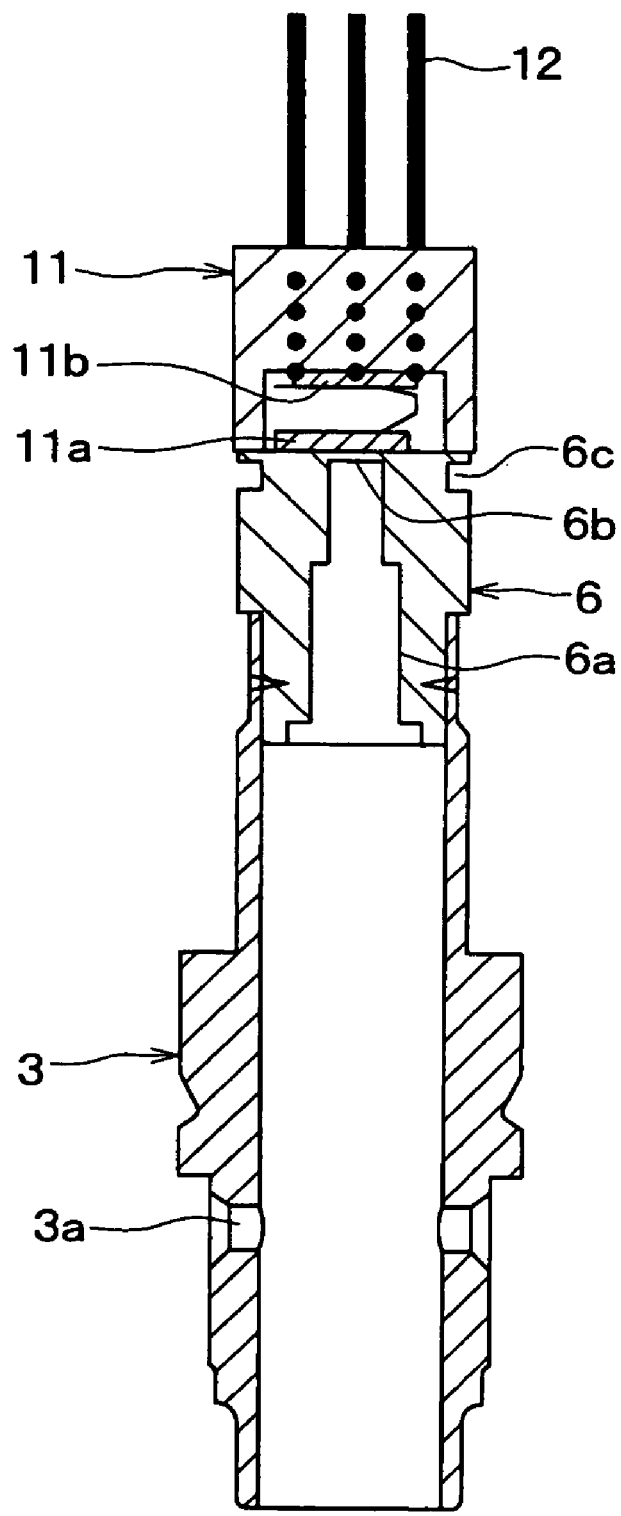
FIG. 2 is a cross sectional view showing a sleeve 3, a stator core 6, and a pressure sensor 11.

A first embodiment of the present invention will be hereinafter explained with reference to the drawings. FIG. 1 is a cross sectional view showing an entire structure of an electromagnetic valve 1 according to a first embodiment of the present invention. And FIG. 2 is a cross sectional view showing a sleeve 3, a stator core 6, and a pressure sensor 11.

The electromagnetic valve 1 is arranged in a fluid passage A for brake fluid, which is for example formed in a housing 2 of a vehicle ABS (anti-lock braking system) actuator. The electromagnetic valve 1 is used as a control valve for brake fluid to close and/or open the fluid passage A in accordance with current supply condition to an electromagnetic coil 9.

The electromagnetic valve 1 has a sleeve 3 of a cylindrical shape, which is formed of a composite magnetic metal. A portion of the sleeve 3, which is positioned at an inner periphery of the electromagnetic coil 9 (explained below), is heat treated so that such portion is non-magnetized.

One end (lower end) of the sleeve 3 is inserted into a hollow portion 2a of the housing 2. A portion of the housing 2 neighboring to an open end of the hollow portion 2a is caulked so that the portion is pushed into a recess of the sleeve 3 to firmly fix the sleeve 3 to the housing 2.

A valve seat member 4 made of a cylindrical metal is inserted (press-fitted) into the one end (lower end) of the sleeve 3. A cup shaped stator core 6 made of magnetic metal is fixed to the other end (an upper end) of the sleeve 3 by welding. One end (an upper side) of an inside space S of the sleeve 3 is closed by the stator core 6.

The inside space S is operatively communicated with the fluid passage A through communication ports 3a formed at an intermediate portion of the sleeve 3 in its axial direction as well as a communication port 4a formed in the valve seat member 4 at a radial center portion thereof. A cylindrical armature 7 made of magnetic metal is slidably arranged in the sleeve 3.

A valve member 7a of a spherical shape is fixed to one end (a lower end, which is on a side to the valve seat member 4) of the armature 7. A valve seat 4b of a tapered shape is formed at the communication port 4a of the valve seat member 4, which is a lower side of the inside space S. The valve member 7a of the armature 7 is seated on or separated from the valve seat 4b. A communication passage 20 is formed in the armature 7, so that the inside space S on a side to the fluid passage A and the inside space S on a side of the stator core 6 are communicated with each other.

A spring 8 is arranged in a spring hole 6a formed in the stator core 6 in order that the armature 7 is biased by the spring 8 toward the valve seat member 4.

The electromagnetic coil 9 is arranged around outer peripheries of the sleeve 3 and the stator core 6, wherein the coil 9 generates magnetic field when electric current is supplied to the coil 9. The electromagnetic coil 9 is accommodated in a yoke 5 made of magnetic metal. Terminals 10 extend from the coil 9, so that the electric current is supplied to the coil 9 from the outside via the terminals 10. The yoke 5 has a cylindrical wall portion 5a and a flanged portion 5b formed at one end of the cylindrical wall portion 5a (on a side to which the armature 7 is attracted in a direction X).

One end of the stator core 6 (an upper end in the direction X) is protruding from the yoke 5, namely protruding in the direction X from a contact point between the yoke 5 and the stator core 6. A thin walled portion 6b is formed at the end of the stator core 6, which is protruding in the direction X, wherein the thin walled portion 6b is deformed depending on brake fluid pressure contained in the inside space S.

The pressure sensor 11 is assembled to the protruding end of the stator core 6, so that the pressure sensor 11 outputs electric signal depending on the brake fluid pressure in the inside space S. The pressure sensor 11 has a sensing gauge 11a and a signal processing circuit 11b. A semi-conductor pressure sensor made of silicon is used as the sensing gauge 11a. The signal processing circuit 11b has a low-pass filter, an amplifier, and a characteristic correcting circuit. The output signal of the pressure sensor 11 is transmitted to ECU 13 via terminals 12. The ECU 13 is mounted on a casing or a printed circuit board 14.

A magnetic flux limiting portion 6c is formed at the stator core 6 to limit flow of magnetic flux. More exactly, the magnetic flux limiting portion 6c is a circular groove formed at an outer peripheral surface of the stator core 6. The groove may be formed by a cutting process. At least a portion of the magnetic flux limiting portion 6c is outwardly protruding from an end surface of the flanged portion 5b of the yoke 5 toward the pressure sensor 11.

When no electric current is supplied to the coil 9 of the electromagnetic valve 1, the armature 7 is biased by the spring force of the spring 8 toward the valve seat member 4, so that the valve member 7a is seated on the valve seat 4b of the valve seat member 4 to close the fluid passage A.

When the electric current is supplied to the coil 9, the magnetic field is generated by the coil 9, so that the magnetic flux flows through the yoke 5, the stator core 6, and the armature 7. The armature 7 is lifted up by the magnetic attracting force toward the stator core 6 against the spring force of the spring 8. As a result, the valve member 7a is separated from the valve seat 4b to open the fluid passage A via the communication ports 3a and 4a as well as the inside space S.

During a period in which the electric current is supplied to the coil 9, the flow of magnetic flux to the pressure sensor 11 is limited by the magnetic flux limiting portion 6c. Accordingly, magnetic noise can be reduced in the pressure sensor 11, even if the pressure sensor 11 is arranged at a position closer to the coil 9. Therefore, more precise detection of the pressure can be possible by the pressure sensor 11 and the electromagnetic valve 1 can be made smaller in size.

In addition, the magnetic noise generated in the pressure sensor 11 is cut off by the low-pass filter, so that the output signal to which magnetic noise has less influence can be sent to the ECU 13.

In addition, since the magnetic flux, which is limited by the magnetic flux limiting portion 6c from flowing to the pressure sensor 11, flows through the armature 7, the performance of the electromagnetic valve 1 (for example, response, attracting force, etc.) is improved.

The magnetic flux limiting portion 6c could be formed by a heat process to non-magnetize a portion of the stator core. However, a crack is likely to be generated in the material of the stator core 6 during a process of rapid heating and rapid cooling. According to the above embodiment of the invention, since the magnetic flux limiting portion 6c is formed by the groove, which can be manufactured by the cutting process, the magnetic flux limiting portion 6c can be more easily formed in the stator core 6 when compared with a case in which the magnetic flux limiting portion 6c is formed by the heating and cooling process.

Furthermore, since the magnetic flux limiting portion 6c is formed by the circular groove, the magnetic flux flow to the pressure sensor 11 can be more surely suppressed, when compared with a case in which the magnetic flux limiting portion 6c is formed by a groove which is partly formed at an outer periphery of the stator core 6.

Furthermore, the groove for the magnetic flux limiting portion 6c can be also used as a chucking portion of the stator core 6 when fixing the stator core 6 to the sleeve 3.

A process for measuring a relationship between temperature and output of the pressure sensor 11 is carried out for correcting temperature characteristic of the pressure sensor 11. The measuring process is preferably carried out in a condition that the pressure sensor 11 is assembled to the stator core 6 but the stator core 6 is not yet fixed to the sleeve 3. According to the above measuring process, a number of parts for heating can be reduced by one (the sleeve 3). A measuring apparatus can be therefore made smaller in its size and cost.

A low-pass filter may be provided in the ECU 13 to eliminate noises breaking into wires connecting the pressure sensor 11 with the ECU 13.

Second Embodiment

Figure 3:
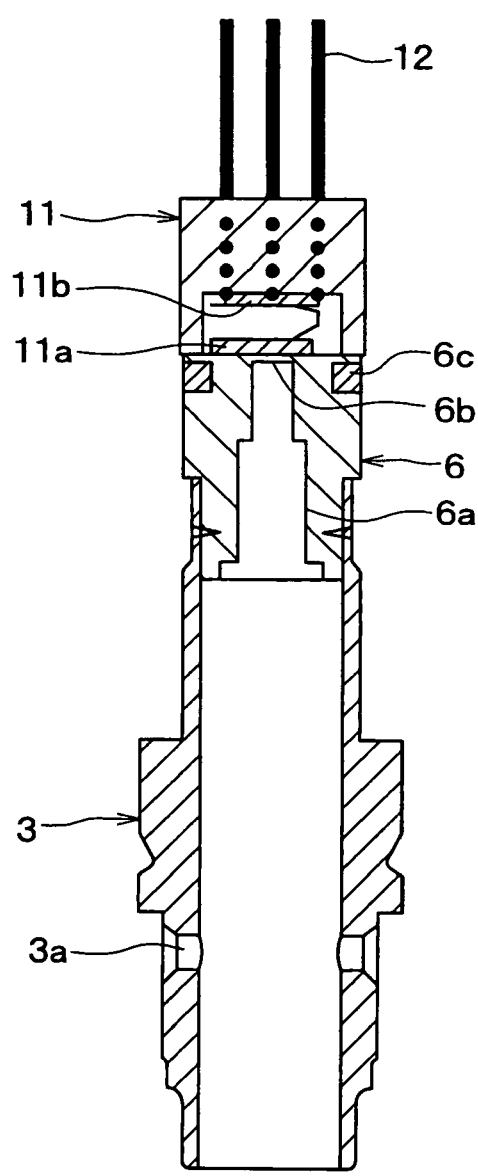
FIG. 3 is a cross sectional view showing a major portion of an electromagnetic valve according to a second embodiment of the present invention.

A second embodiment of the present invention will be explained. FIG. 3 is a cross sectional view showing a major portion of an electromagnetic valve according to a second embodiment of the present invention. According to the embodiment, a portion of the stator core 6 is non-magnetized to form the magnetic flux limiting portion 6c. The other portions are the same to those of the first embodiment.

The stator core 6 of the second embodiment is made of magnetic metal, such as martensitic stainless steel. A portion of the stator core 6 is heated by laser radiation and then cooled down, so that martensite is changed to austenite (namely non-magnetized). More exactly, the heat of the portion which is heated by the laser radiation is absorbed by base material surrounding the heated portion after the termination of the laser radiation, so that such heated and cooled down portion is non-magnetized. Such non-magnetized portion forms the magnetic flux limiting portion 6c. And at least a portion of the magnetic flux limiting portion 6c is outwardly protruding from the end surface of the flanged portion 5b of the yoke 5 toward the pressure sensor 11.

According to the second embodiment, the magnetic flux flow to the pressure sensor 11 can be likewise suppressed by the magnetic flux limiting portion 6c. Therefore, magnetic noise can be reduced in the pressure sensor 11, even if the pressure sensor 11 is arranged at a position closer to the coil 9. As a result, more precise detection of the pressure can be possible by the pressure sensor 11 and the electromagnetic valve 1 can be made smaller in size.

Furthermore, since the portion of the stator core 6 is heated by the laser radiation, it is easy to heat a narrow area which should be non-magnetized. In addition, a manufacturing time can be made shorter, when compared with the case in which the groove is formed by the cutting process to form the magnetic flux limiting portion 6c.

Third Embodiment

Figure 4A:
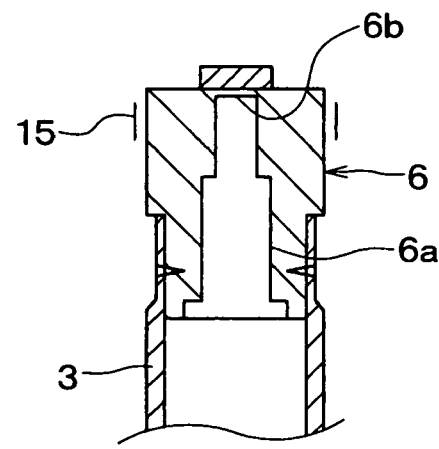
FIGS. 4A and 4B are cross sectional views showing a major portion of an electromagnetic valve according to a third embodiment of the present invention.
Figure 4B:
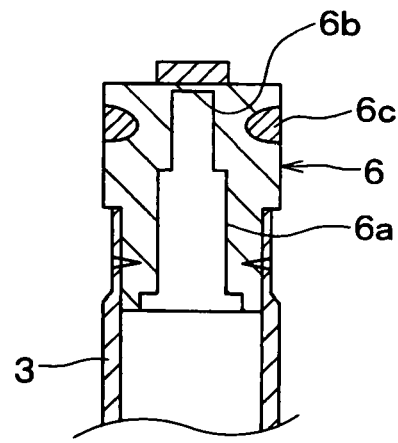

A third embodiment of the present invention will be explained FIGS. 4A and 4B are cross sectional views showing a major portion of an electromagnetic valve according to the third embodiment of the present invention. According to the embodiment, a portion of the stator core 6 is non-magnetized to form the magnetic flux limiting portion 6c. The other portions are the same to those of the first embodiment.

The stator core 6 of this embodiment is made of magnetic metal, such as Nickel alloy metal. More exactly, the metal, which has the same or almost the same coefficient of linear expansion to that of the sensing gauge 11a mainly made of silicon, is used as the material for the stator core 6.

A non-magnetic metal foil 15 of a different metal from the stator core 6 is wound around an outer periphery of the stator core 6, as shown in FIG. 4A, in order to non-magnetize a portion of the stator core 6. Then, laser radiation is carried out at such portion, at which the non-magnetic metal foil 15 of the different metal is wound, to melt the different metal 15 and neighboring base material of the stator core 6. The portion, in which the different metal and the base material are molten, is non-magnetized to form the magnetic flux limiting portion 6c, as shown in FIG. 4B. And as in the same manner to the first and second embodiments, at least a portion of the magnetic flux limiting portion 6c is outwardly protruding from the end surface of the flanged portion 5b of the yoke 5 toward the pressure sensor 11.

According to the third embodiment, the magnetic flux flow to the pressure sensor 11 can be likewise suppressed by the magnetic flux limiting portion 6c. Therefore, magnetic noise can be reduced in the pressure sensor 11, even if the pressure sensor 11 is arranged at a position closer to the coil 9. As a result, more precise detection of the pressure can be possible by the pressure sensor 11 and the electromagnetic valve 1 can be made smaller in size.

Furthermore, as in the same manner to the second embodiment, since the portion of the stator core 6 is heated by the laser radiation, it is easy to heat a narrow area which should be non-magnetized. In addition, a manufacturing time can be made shorter, when compared with the case in which the groove is formed by the cutting process to form the magnetic flux limiting portion 6c.

In addition, according to the manufacturing method of the third embodiment (the base material of the stator core 6 and the different metal 15 are molten together), it is easy to form the magnetic flux limiting portion 6c in the stator core 6, which is made of such a material that is not non-magnetized by heating process.

It is not necessary to carry out an off-set operation for an abnormal outputs from the pressure sensor 11 due to thermal strain. This is because the base material of the stator core 6 and the different metal 15 are molten to non-magnetize before the pressure sensor 11 is assembled to the stator core 6.

Fourth Embodiment

Figure 5A:
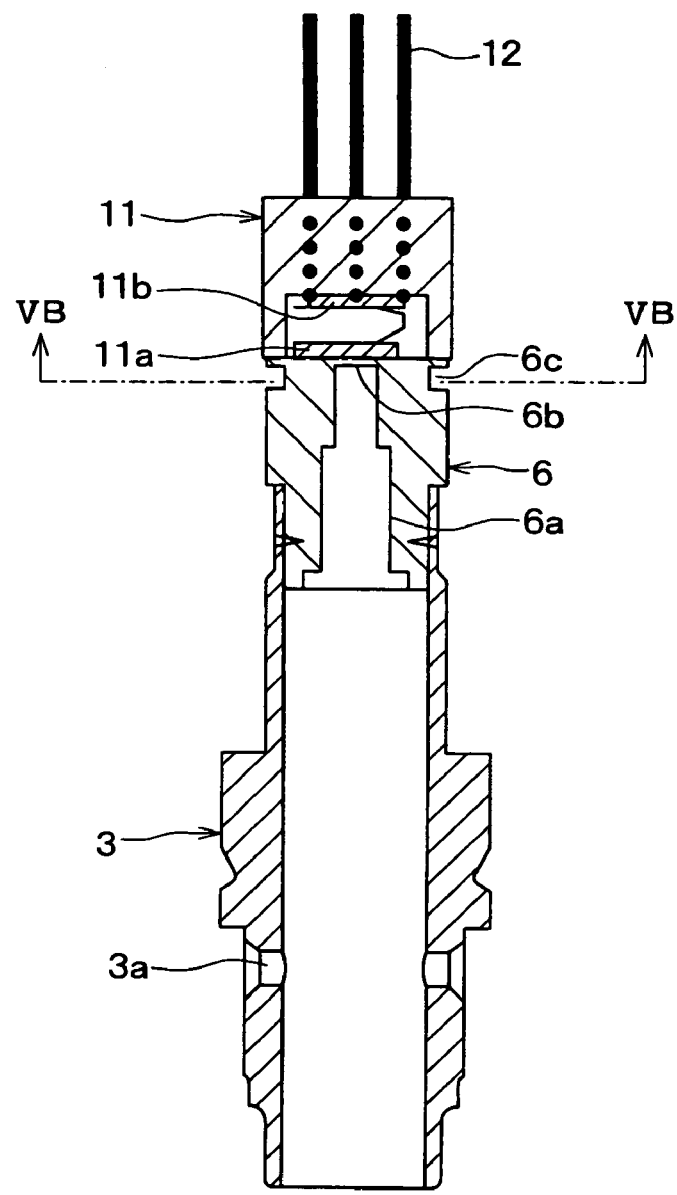
FIG. 5A is a cross sectional view showing a major portion of an electromagnetic valve according to a fourth embodiment of the present invention.
Figure 5B:
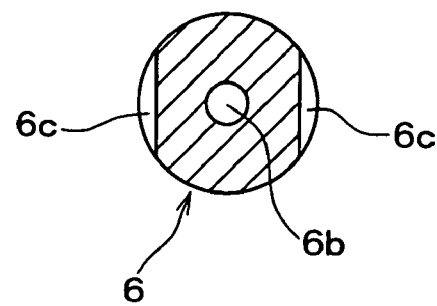
FIG. 5B is a cross sectional view taken along a line VB-VB in FIG. 5A.

A fourth embodiment of the present invention will be explained. FIG. 5A is a cross sectional view showing a major portion of an electromagnetic valve according to a fourth embodiment of the present invention, and FIG. 5B is a cross sectional view taken along a line VB-VB in FIG. 5A.

According to the first embodiment, the magnetic flux limiting portion 6c is formed by the circular groove. According to the fourth embodiment, the magnetic flux limiting portion 6c is formed by grooves which are formed partly at the outer periphery of the stator core 6, as shown in FIGS. 5A and 5B. More exactly, a pair of notches opposing to each other in a radial direction is formed as the magnetic flux limiting portion 6c.

In the case that the magnetic flux limiting portion 6c is formed by such pair of notches (grooves), the magnetic flux limiting portion 6c (the notches/grooves) can be used as a reference position for assembling the electromagnetic valve 1 during a manufacturing process. More exactly, when the pressure sensor 11 is assembled to the stator core 6, and when the stator core 6 is assembled to the housing 2, the magnetic flux limiting portion 6c is used as the reference position for positioning the pressure sensor 11 and/or the stator core 6 in its circumferential direction. As a result, it is possible to easily and exactly position the terminals 12 of the pressure sensor 11 with respect to terminal insertion holes formed in the printed circuit board 14.

Since the magnetic flux limiting portion 6c is formed partly on the outer periphery of the stator core 6 in its circumferential direction, the magnetic flux flow to the pressure sensor 11 can be suppressed to achieve more precise pressure detection, and in addition a variation of the magnetic flux flow to the armature 7 can be also suppressed.

Modifications

In the above embodiments, the pressure sensor 11 is explained as a sensor for detecting fluid pressure filled in the electromagnetic valve 1. The present invention (the electromagnetic valve of the present invention) can be applied to other types of sensors, for example, a sensor for detecting temperature of the electromagnetic valve, a sensor for detecting temperature of fluid, a sensor for outputting a signal for diagnosing whether the electromagnetic valve or the sensor itself is operating in a good order, and so on.

In the second or third embodiment, a depth of the magnetic flux limiting portion 6c (that is, a length in a radial direction) may be changed partly in a circumferential direction. According to such a modification, the magnetic flux flow to the pressure sensor 11 can be suppressed to achieve more precise pressure detection, and in addition a variation of the magnetic flux flow to the armature 7 can be also suppressed.

What is claimed is:

1. An electromagnetic valve comprising:
a valve unit having;
an electromagnetic coil for generating magnetic field when electric current is supplied thereto;
a yoke made of magnetic material and accommodating the electromagnetic coil;
a stator core arranged at its one end in an inner periphery of the electromagnetic coil, the other end of the stator core being outwardly protruding from an end of the yoke; and
an armature made of magnetic material and arranged in the inner periphery of the electromagnetic coil in such a manner that the armature slides in an axial direction of the electromagnetic coil, so that the armature is attracted toward the stator core when the electric current is supplied to the electromagnetic coil;
a sensor attached to a protruding end of the stator core for detecting at least one of a condition of the valve unit and a condition of fluid filled in the valve unit;
a magnetic flux limiting portion formed in the stator core on a side of the protruding end toward the sensor for suppressing magnetic flux flow to the sensor,
wherein the magnetic flux limiting portion outwardly protrudes away from the end of the yoke toward the sensor.

2. The electromagnetic valve according to claim 1, wherein the magnetic flux limiting portion is formed by a groove formed at an outer peripheral surface of the stator core.

3. The electromagnetic valve according to claim 2, wherein the groove is a circular groove formed at the outer peripheral surface of the stator core.

4. The electromagnetic valve according to claim 1, wherein the magnetic flux limiting portion is formed by a non-magnetized portion of the stator core.

5. A method for manufacturing the electromagnetic valve according to claim 4, comprising:
a step for carrying out laser radiation for such a portion of the stator core, which corresponds to the magnetic flux limiting portion,
wherein the stator core is made of such material, which is non-magnetized when it is heated.

6. A method for manufacturing the electromagnetic valve according to claim 4, comprising:
a step for winding a different metal of non-magnetic material around an outer periphery of the stator core, the different metal being different from a metal for the stator core; and
a step for melting the different metal and a base material of the stator core to form the magnetic flux limiting portion.

7. The method for manufacturing the electromagnetic valve according to claim 6, wherein the different metal is formed by nickel foil.

8. The method for manufacturing the electromagnetic valve according to claim 7, the different metal and the base material of the stator core are molten by heat of laser radiation.

9. An electromagnetic valve comprising:
a valve unit having:
an electromagnetic coil which generates a magnetic field when electric current is supplied to the electromagnetic coil,
a yoke made of magnetic material and accommodating the electromagnetic coil,
a stator core arranged at its one end in an inner periphery of the electromagnetic coil, the other end of the stator core outwardly protruding from an end of the yoke, and
an armature made of magnetic material and arranged in the inner periphery of the electromagnetic coil in such a manner that the armature slides in an axial direction of the electromagnetic coil, so that the armature is attracted toward the stator core when the electric current is supplied to the electromagnetic coil;
a sensor attached to a protruding end of the stator core for detecting at least one of a condition of the valve unit and a condition of fluid filled in the valve unit, the protruding end of the stator core having a thin walled portion which is deformed depending on pressure of the fluid in the valve unit;
a magnetic flux limiting portion formed in the stator core on a side of the protruding end toward the sensor for suppressing magnetic flux flow to the sensor;

wherein the magnetic flux limiting portion is formed by a groove formed at an outer peripheral surface of the stator core;

wherein the thin walled portion is continuously formed from the magnetic flux limiting portion; and wherein the magnetic flux limiting portion outwardly protrudes away from the end of the yoke toward the sensor.

10. The electromagnetic valve according to claim 9, wherein the groove is a circular groove formed at the outer peripheral surface of the stator core.

11. The electromagnetic valve according to claim 9, wherein the groove extends axially beyond the end of the yoke so that at least a portion of the groove is not surrounded by the yoke.

12. An electromagnetic valve comprising:
- a valve unit having:
    - an electromagnetic coil which generates a magnetic field when electric current is supplied to the electromagnetic coil,
    - a yoke made of magnetic material and accommodating the electromagnetic coil,
    - a stator core arranged at its one end in an inner periphery of the electromagnetic coil, the other end of the stator core outwardly protruding from an end of the yoke, and
    - an armature made of magnetic material and arranged in the inner periphery of the electromagnetic coil in such a manner that the armature slides in an axial direction of the electromagnetic coil, so that the armature is attracted toward the stator core when the electric current is supplied to the electromagnetic coil;
- a sensor attached to a protruding end of the stator core for detecting at least one of a condition of the valve unit and a condition of fluid filled in the valve unit, the protruding end of the stator core having a thin walled portion which is deformed depending on pressure of the fluid in the valve unit;
- a magnetic flux limiting portion formed in the stator core on a side of the protruding end toward the sensor for suppressing magnetic flux flow to the sensor;

wherein the magnetic flux limiting portion is formed by a groove formed at an outer peripheral surface of the stator core;

wherein the thin walled portion is continuously formed from the magnetic flux limiting portion; and wherein the groove extends axially beyond the end of the yoke so that at least a portion of the groove is not surrounded by the yoke.

* * * * *